June 29, 1965  H. N. EKLUND  3,191,445
ANGULAR RATE MEASURING DEVICE
Filed Sept. 5, 1961  4 Sheets-Sheet 1

INVENTOR.
HARRY NILS EKLUND
BY Richard P. Alberi
AGENT

*INVENTOR.*
HARRY NILS EKLUND

June 29, 1965   H. N. EKLUND   3,191,445
ANGULAR RATE MEASURING DEVICE
Filed Sept. 5, 1961   4 Sheets-Sheet 3

INVENTOR.
HARRY NILS EKLUND
BY *Richard P. Alben*
AGENT

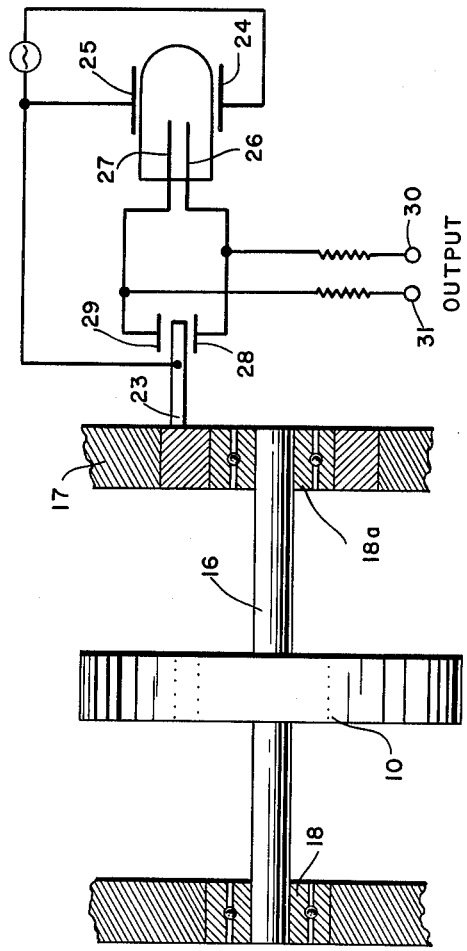
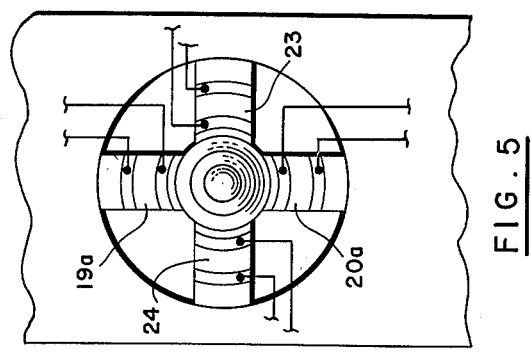

United States Patent Office 3,191,445
Patented June 29, 1965

3,191,445
ANGULAR RATE MEASURING DEVICE
Harry Nils Eklund, Pacific Palisades, Calif., assignor, by mesne assignments, to Lear Siegler, Inc., Santa Monica, Calif., a corporation of Delaware
Filed Sept. 5, 1961, Ser. No. 135,972
11 Claims. (Cl. 74—5.6)

This invention relates to rate gyroscopes, more particularly, to gyroscopic means for measuring the angular rate of movement of a vehicle about a given axis.

Present rate gyroscopes have the output axis substantially restrained such that a torque applied about the input axis causes a steady state torque to be applied about the output axis. The output torque is detected by any one of a number of different transducers which emit an electrical signal proportional in magnitude to the torque about the output axis. The disadvantage of this type of gyroscope is that the output is a steady state torque, which by its very nature tends to provide a very low signal-to-noise ratio, and, consequently, in many applications requires elaborate circuitry to enhance the signal-to-noise ratio. Furthermore, the gyroscope rotor has to be designed so that it is completely symmetrical and dynamically balanced. Great pains are taken to assure that the rotor is completely symmetrical and dynamically balanced.

It is, therefore, an object of this device to provide a gyroscopic rate measuring device which has a very high signal-to-noise ratio.

It is another object of this invention to provide a gyroscopic rate measuring device using an unsymmetrical spin rotor having its spin axis constrained to follow the motions of the vehicle upon which it is mounted.

Still another object of this invention is to measure the alternating reaction torque of a gyroscope having an unsymmetrical rotor, about two perpendicular axes, and to convert them into suitable signals either for controlling a vehicle or for displaying the rate of angular movement of the vehicle.

The present invention utilizes the oscillatory properties associated with an unsymmetrical rotor and employs the same for a novel and useful purpose. The unsymmetrical rotor provides alternating torque about the output axis with a frequency which is exactly twice the frequency of the rotor about the spin axis. The output axis can be any axis in a plane perpendicular to the spin axis of the rotor provided a suitable pickoff is associated with the particular axis chosen.

A better understanding of the objects and advantages of the invention will be had in the following description when taken in conjunction with the drawings, in which:

FIG. 5 is an end view of FIG. 3 showing a second embodiment of the present invention; and FIG. 6 is a plan view partially in schematic of another embodiment of the present invention.

Figure 1:
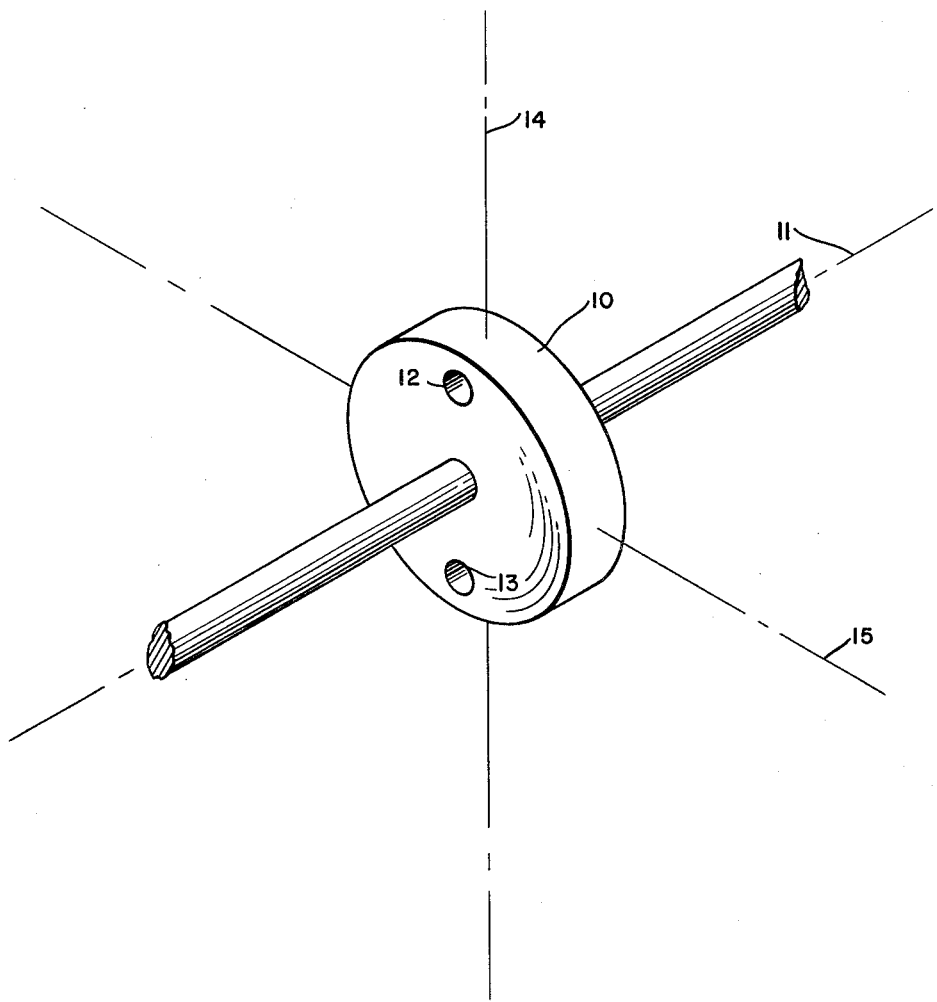
FIG. 1 is a perspective view of a rotor of the present invention.
Figure 2:
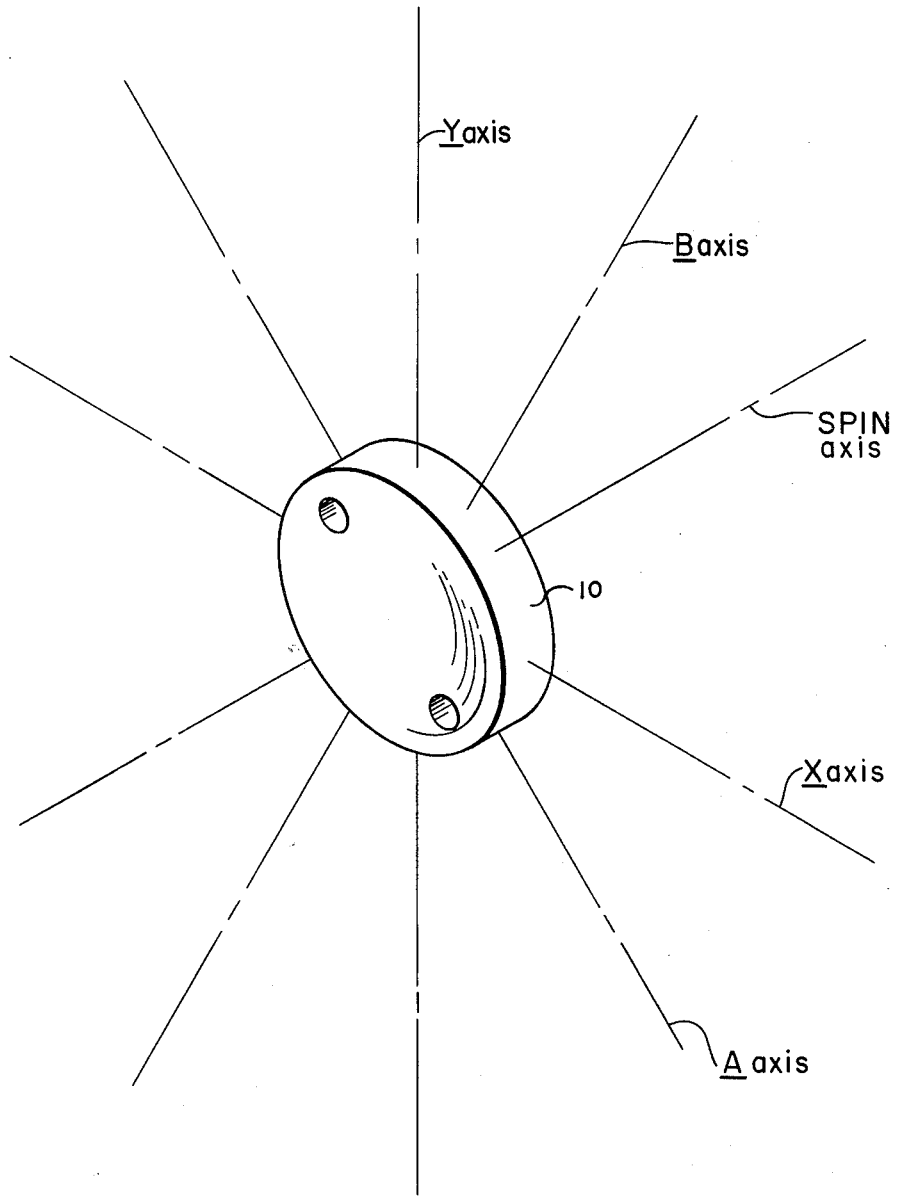
FIG. 2 is a diagrammatic display of the axes of the rotor.

In FIG. 1 the rotor 10 has a spin axis 11. The rotor 10 is unsymmetrical, i.e., has different moments of inertia about two perpendicular axes in the plane perpendicular to the spin axis, and for purposes of explanation, it is shown in FIG. 1 with holes 12 and 13 therein. Note that the holes 12 and 13 are opposite each other and equidistant from the spin axis of the rotor. It can be demonstrated both mathematically and experimentally that with the rotor 10 spinning about the spin axis 11, when a torque is applied about the input axis 14, the rotor has a wobbling motion about the output axis 15. This is because the moment of inertia of the rotor about the output axis 15 varies periodically and has two maximums and two minimums for each complete revolution of the rotor. This is the reason for the torque variations being twice the rotor spin frequency.

For a theoretical explanation of the reactions of the unsymmetrical rotor, consider the following two formulae; derivable from gyroscopic theory:

$$M_X = (\theta_A - \theta_B)\omega_0\Omega_X \sin 2\psi + (\theta_A - \theta_B)\omega_0\Omega_Y \cos 2\psi + \theta_C\omega_0\Omega_Y$$

$$M_Y = (\theta_A - \theta_B)\omega_0\Omega_X \cos 2\psi + (\theta_A - \theta_B)\omega_0\Omega_Y \sin 2\psi - \theta_C\omega_0\Omega_X$$

Where:

$M_X$ = reaction torque about the X axis
$M_Y$ = reaction torque about the Y axis
$\omega_0$ = spin velocity of rotor
$\psi = \omega_0 t$ = the angle the rotor moves about the spin axis
$\theta_A$ = moment of inertia about the A axis
$\theta_B$ = moment of inertia about the B axis
$\theta_C$ = moment of inertia about the spin axis
$\Omega_X$ = angular velocity about the X axis
$\Omega_Y$ = angular velocity about the Y axis The above two formulae are used to compute the reaction torque about the two axes X and Y, of a rate gyroscope rotor. Note, though, that in a conventional symmetrical gyroscope rotor $\theta_A$ is always equal to $\theta_B$ and, therefore, the first two terms in both formulaes drop out leaving the reaction torque about the X axis equal to $\theta_C\omega_0\Omega_Y$, and, likewise, the reaction torque about the Y axis is $-\theta_C\omega_0\Omega_X$. These are the customary steady-state moments obtained from a symmetrical, constrained gyroscope. However, when $\theta_A$ does not equal $\theta_B$, as in the case when the gyroscope rotor is made unsymmetrical as shown in FIG. 1, then the reaction torque about the X and Y axes varies continually and cyclically, as the rotor spins about the spin axis. Note, that because the moment of inertia of the rotor varies twice between a maximum and a minimum value with respect to the X and the Y axes, the frequency of varying torque about either of these axes is twice the frequency of the spin frequency of the rotor about the spin axis. In general, it is desirable to obtain signals which are proportional to the individual angular velocities $\Omega_X$ and $\Omega_Y$ about the X axis and the Y axis, respectively. Since these two signals are in quadrature, as may be seen from the above two equations, the output signal can readily be resolved into the individual components by means of more or less conventional detector methods.

Figure 3:
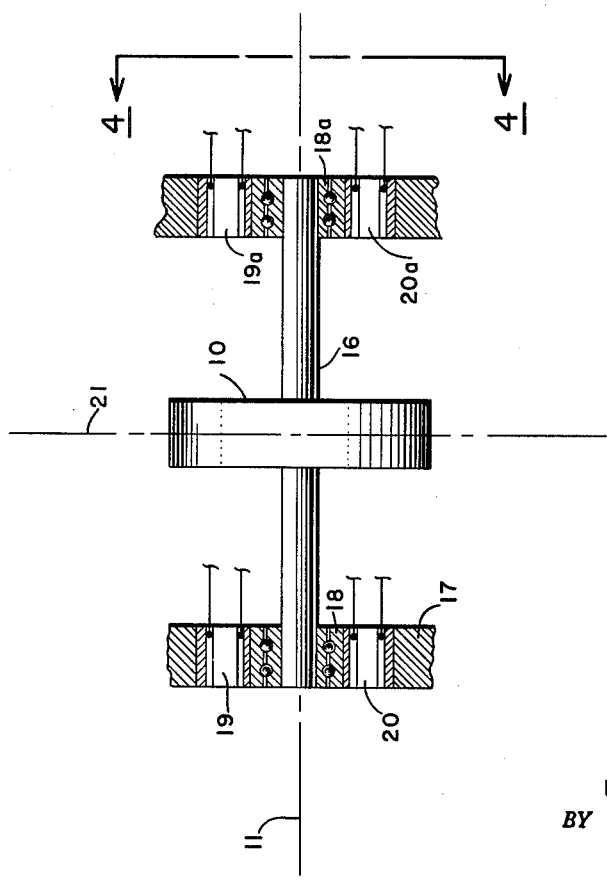
FIG. 3 is a plan view of the rotor and the pickoffs.

In FIG. 3 the rotor 10 is free to rotate about the spin axis 11. The shaft 16 is supported by the housing 17, bearings 18 and 18$_a$, and piezo electrical elements 19, 19$_a$', 20 and 20$_a$.

Figure 4:
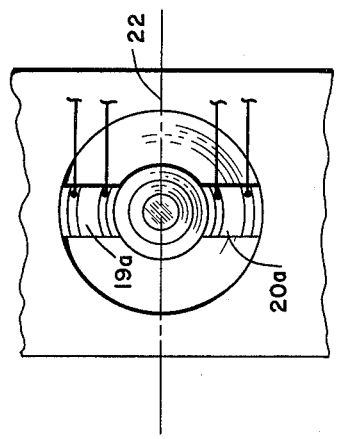
FIG. 4 is an end view taken along lines 4–4 in FIG. 3.

The device shown in FIGS. 3 and 4 is set up to detect angular rate movement about the axis 21. It can be seen now that using an unsymmetrical rotor 10, an alternating torque will appear about the output axis 22, perpendicular to the axis 21, the frequency of the torque being twice the spin frequency of the rotor 10. Since piezo electrical elements 19, 19$_a$, 20, and 20$_a$ emit an electrical signal proportional to the compression or strain applied to them, these piezo electrical elements emit an electrical signal proportional to the reactive forces set up by the output torque, and having a frequency twice the spin frequency of the rotor 10. Note that it is not necessary to use piezo electrical elements 19$_a$ and 20$_a$ since the piezo electrical elements 19 and 20 will suffice. It is even possible to limit the number of piezo electrical elements to one, e.g., element 19; however, the use of the added elements increases the magnitude of the signal and, furthermore, they may be compared to insure reliability.

Since the piezo electrical elements emit an electrical signal which has a frequency twice the spin frequency of the rotor 10, and since the spin frequency of rotor 10 in present day gyroscopes is or can be controlled within a very narrow frequency band, it is extremely easy to filter out any undesirable frequencies or noise frequencies, and, furthermore, to filter out the steady-state electrical components which are also present.

In FIG. 5, it is seen that the piezo electric elements $19_a$ and $20_a$ are positioned on opposite sides of the shaft 16 along a first straight line perpendicular to and intersecting the shaft 16, which is shown as a small round circle in the middle of the figure. Piezo electric elements 23 and 24 are positioned on opposite sides of the shafts 16 along a second straight line perpendicular to and intersecting the axis of shaft 16, and also perpendicular to the first line. When the outputs of two piezoelectric elements positioned on opposite sides are combined the signal will, of course, have an amplitude twice as large as would be obtainable with only one element, and the polarity of the output signal will obviously bear a direct relationship to the direction of rotation about the input axis. In addition, as seen in FIG. 5, the provision of two piezo electric elements along a straight line, one on each side of the shaft, results in a symmetrical mounting structure for the shaft along said line and provides for equal total responses for both positive and negative forces of the same magnitude along said line.

In certain instances, it is convenient to add a second set of piezo electric elements in quadrature with the first set of piezo electric elements as shown in FIG. 5. This arrangement offers certain advantages by yielding an output signal twice as high as that obtained with only one set of piezo electric elements.

The shape and positioning of the piezo electrical elements shown in FIGS. 3, 4 and 5 can be changed radically without altering the basic effect or principle of the device, and, furthermore, piezo electric elements in bending, torsion, or twist, or other modes can be used in addition to the compression mode indicated in the figures. For example, the shaft 16 in FIG. 3 can have a section of it replaced with a suitable piezo electrical element. The piezo electrical element can be between the shaft 16 and the bearings 18 and $18_a$ rather than on the outside of the bearings 18 and $18_a$. Furthermore, it is contemplated that any device which will detect alternating mechanical forces, and convert them into electrical signals, can be used in place of the piezo electrical element. It is possible to use strain gauges, or other deformable but still relatively rigid measuring means on the output shaft 16.

In order to increase the mechanical amplitude of the vibration before converting it to an electrical signal, it is possible to design the mechanical-to-electrical signal transducer to have a natural mechanical frequency, i.e., a resonant frequency, equal to twice the spin frequency of the rotor 10, so that the wobble frequency of the rotor, due to the impressed rate about the input axis, will coincide with the natural mechanical frequency of the signal transducer and thus greatly amplify the microscopic motion to be transformed into an electrical signal.

In particular, attention is called to FIG. 6 wherein a tuned resonator 23 is capacitively coupled to a typical circuit for measuring capacitance utilizing what is known in the art as an ionization transducer. The transducer is excited by applying an alternating current voltage to the two external electrodes 24 and 25, while the internal probe electrodes 26 and 27 are electrically connected to the opposing plates 28 and 29. The plates 28 and 29 together with the resonator 23 are arranged to form a differential capacitor, whose differential capacitance is, thus, proportional to the amplitude of vibration of the resonator 23. The signal output on the terminals 30 and 31 has an amplitude proportional to the amplitude of the vibrating resonator 23, and has a frequency equal to the frequency of the resonator 23.

Thus, the signal output voltage amplitude is proportional to the instantaneous rate of motion about the input axis of the rotor 10, and has a frequency twice that of the spin frequency of the rotor.

When a gyroscope of this type is used, e.g., in an aircraft, and mounted such that the input axis of the gyroscope is positioned approximately parallel to the pitch axis of the aircraft, the rotor produces an oscillatory torque about the output axis when the aircraft has an angular rate about the pitch axis. The oscillatory torque is proportional in magnitude to the angular pitch rate of the aircraft and, therefore, the electrical output signal from the sensors is also proportional to the angular rate of the aircraft about the pitch axis. The electrical signal from the sensors may be used to drive an indicator, to position the control surfaces of the aircraft, or in any other conventional manner to aid in the control of the aircraft.

Although the device of this invention has been particularly described above, it is not intended that the invention should be limited by the particular description which utilizes an angular rate measuring device but only in accordance with the spirit and scope of the appended claims.

What I claim:
1. An angular rate measuring device comprising:
   a gyroscope having a housing;
   a rotating shaft firmly radially constrained and journalled adjacent its ends in said housing;
   a gyroscope rotor mounted on said shaft, said rotor having a spin axis coaxial with the axis of said shaft;
   said rotor having unequal moments of inertia about two mutually perpendicular axes in the plane of rotation of said rotor;
   vibration sensing means in physical,force-reactive communication with said rotor and said housing;
   said gyroscope having at least one input axis and at least one output axis, said input and output axis being perpendicular to said spin axis;
   said rotor being constrained with respect to movement about said output axis, whereby upon rotation of the said rotor about an input axis, an oscillatory torque having a frequency which is twice the rotor spin frequency, is generated by said rotor about an output axis which results in oscillating radial forces being communicated by said shaft to said vibration sensing means; and
   whereby an output signal is generated by said vibration sensing means in response to said force communicated thereto.

2. The device of claim 1 wherein said vibration sensing means is positioned between said rotor shaft and said housing.

3. The device as described in claim 1 wherein said vibration sensing means is a strain gauge means.

4. The device as described in claim 1 wherein said vibration sensing means is a tuned resonator means.

5. The device as described in claim 1 wherein said vibration sensing means is a tuned resonator means comprising:
   a measuring device having a differential capacitor, the movable center element of which is a resonant member connected to said housing, said measuring device having a signal output, the amplitude of which is proportional to the amplitude of said oscillatory torque and the frequency of which is the same as the frequency of said oscillatory torque.

6. The device of claim 1 wherein said vibration sensing means comprise a plurality of piezo electric elements.

7. The device of claim 1 wherein said vibrating sensing means comprise two piezo electric elements positioned one on each side of said shaft along a line intersecting the axis of said shaft and perpendicular thereto.

8. The device of claim 1 wherein said vibration sensing means comprise first and second piezo electric elements positioned on opposite sides of said shaft along a first line perpendicular to and intersecting the axis of said shaft, and a third and fourth piezo electric element positioned on opposite sides of said shaft along a second line perpendicular to and intersecting said shaft and also perpendicular to said first line.

9. The angular rate measuring device of claim 1 wherein said vibration sensing means has a natural frequency substantially equivalent to twice the spin frequency.

10. The device of claim 1 wherein said vibration sensing means is a piezo electric element.

11. The angular rate measuring device of claim 10 wherein said vibration sensing means has a natural frequency substantially equivalent to twice the spin frequency.

References Cited by the Examiner
UNITED STATES PATENTS

| | | | |
|---|---|---|---|
| 1,801,619 | 4/31 | Arrea | 74—5 X |
| 2,447,863 | 8/48 | Kent et al. | 73—70.2 |
| 2,968,031 | 1/61 | Higa | 73—71.4 |
| 2,991,659 | 7/61 | Bowden | 74—5 X |

BROUGHTON G. DURHAM, *Primary Examiner.*